Nov. 8, 1960  M. B. HUTSON  2,959,694
ADJUSTABLE SPEED SQUIRREL CAGE INDUCTION MOTOR
Filed May 6, 1959  2 Sheets-Sheet 2
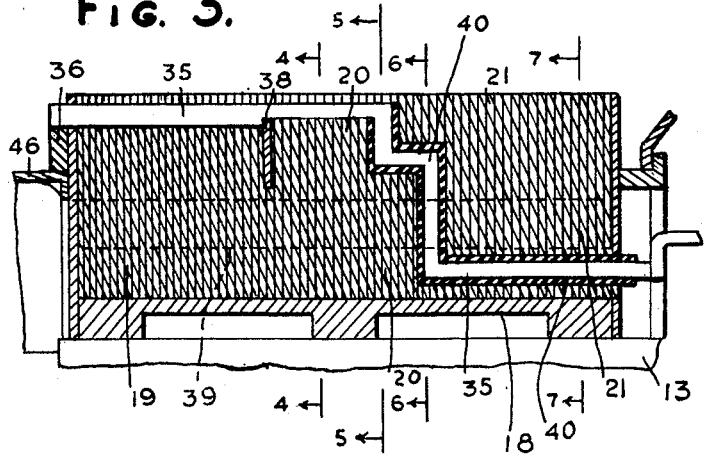
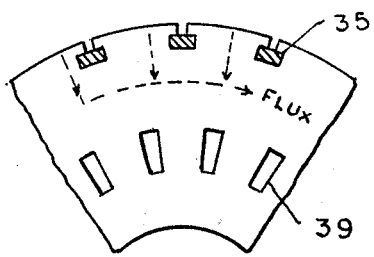
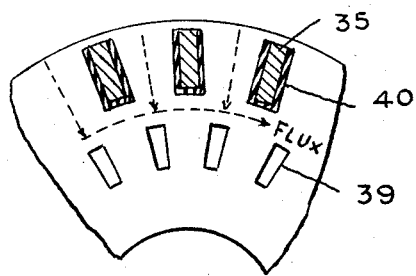
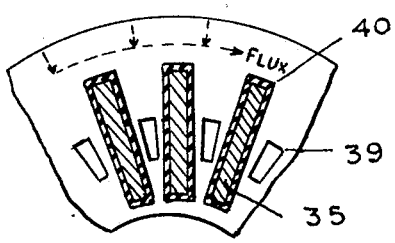
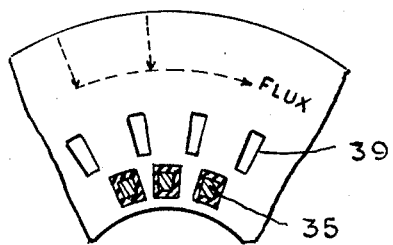
INVENTOR
MILES B. HUTSON
BY *Holcombe, Wetherill + Brisebois*
ATTORNEYS United States Patent Office 2,959,694
Patented Nov. 8, 1960

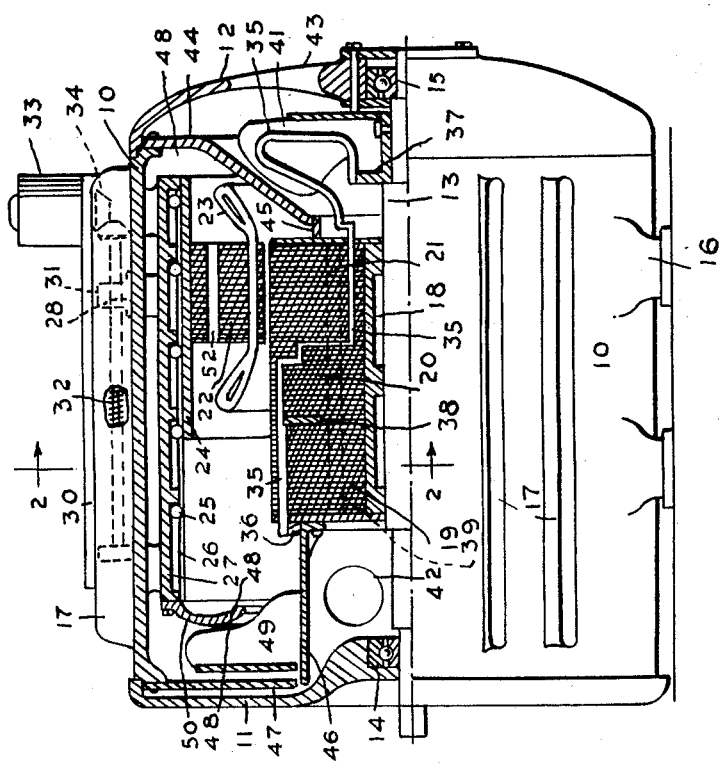
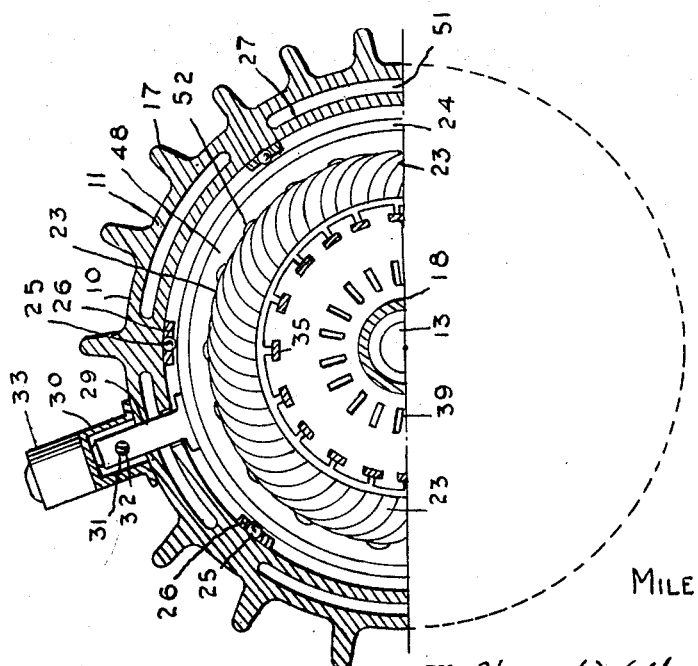

2,959,694

ADJUSTABLE SPEED SQUIRREL CAGE INDUCTION MOTOR

Miles B. Hutson, 321 Hillary St., New Orleans, La.

Filed May 6, 1959, Ser. No. 811,424

9 Claims. (Cl. 310—61)

The present invention relates in general to squirrel cage induction motors and more particularly to an adjustable speed squirrel cage induction motor using low and high resistance rotor sections with a common stator, and is in the nature of an improvement over my co-pending application Serial No. 769,018 filed October 22, 1958.

At present, induction motors of the squirrel cage type capable of use at various speeds are available only at the disadvantage of relatively great bulk, complication of structure and increased cost of manufacture and maintenance.

An object of the present invention is the provision of a squirrel cage motor having mounted within its casing the relatively high resistance circuits required for starting and low speed operation, together with means for adequate dissipation of heat generated in such high resistance circuits without increase in bulk and complication of structure.

Another object of the present invention is to provide an induction motor of the squirrel cage type capable of operation at various speeds for appreciable intervals of time, longer than that required in starting, as in the operation of cranes, hoists, etc., and with satisfactory power output.

Another object is the provision of a motor of the above type comprising a novel cooperative combination and arrangement of parts resulting in a simple, compact, and sturdy structure, comparatively inexpensive to manufacture.

A further object is the provision of simple and effective means for shielding the stator and its windings from heated coolant used in absorption of heat from the high resistance circuit.

A further object is the provision of a novel arrangement and proportion of parts whereby the high resistance rotor circuit may pass directly through a nondriving section of the rotor to an end ring without production of torque in the nondriving rotor section and with minimum transfer of heat to the nondriving section.

Another object is the provision of a closed circuit cooling system for the stator and its winding separate from the cooling system of the high resistance circuit.

Various other objects and advantages of the invention will become apparent from a perusal of the following specification and the accompanying drawings in which:

Figure 1 is a side view of my motor showing the upper half in longitudinal section.

Figure 2 is a transverse section of the upper half of Fig. 1 taken on the line 2—2.

Figure 3 is an enlarged, fragmentary view of a portion of Fig. 1 showing the upper part of the rotor in longitudinal section.

Figure 4 is a section on line 4—4 of Fig. 3.

Figure 5 is a section on line 5—5 of Fig. 3.

Figure 6 is a section on line 6—6 of Fig. 3.

Figure 7 is a section on line 7—7 of Fig. 3.

Referring to the drawings in detail, the active motor parts are housed in a cylindrical frame 10 closed at the ends by end bells 11 and 12, the latter supporting the motor driveshaft 13 in ball bearings 14—15. Feet 16 cast with or otherwise suitably secured to the frame are provided for mounting the motor on a base or other suitable support. Cooling fins 17 cast with or otherwise secured to the frame in good thermal contact therewith are provided for dissipation of heat from the motor. A cylindrical spider element 18 fixed to the motor shaft 13 carries the rotor consisting of three sections 19, 20, and 21, longitudinally spaced end-to-end, and built up of a single continuous stack of laminations of low reluctance magnetic material.

A suitable common rotating magnetic field for the several rotor sections is provided by a conventional stator element 22, having, according to standard practice, the usual energizing polyphase windings 23, the stator being of an axial width substantially that of the rotor section 19 and slidably mounted for axial or longitudinal movement into operative surrounding relation with any of the rotor sections. Means for so mounting the stator is provided in the form of a cylindrical mounting ring 24, carrying the field structure, and longitudinally slidable along a series of ball bearings 25 mounted in lineal ball bearing raceways 26 carried by the frame 11 on its inwardly spaced wall section 27.

A lug 28 carried by the stator mounting ring 24 extends through a longitudinal slot 29 (Fig. 2) in the motor wall or frame 11, into an elongated housing 30 where it is provided with a threaded bore 31, threaded to receive a feed screw 32 for moving the stator back and forth longitudinally to bring it, selectively, into encircling relation with the different rotor sections 19, 20, and 21. A reversible control motor 33 is provided for driving the feed screw 32 through suitable bevel gears 34 in either direction.

Sections 19 and 20 of the rotor constitute, respectively, low and high resistance induction or driving rotor sections of the squirrel cage type, while section 21 is a nondriving, noninductive section providing a magnetic body in the form of an axial extension of the rotor effective as a noninductive, field shunting rotor section for completing the magnetic circuit of such portions of the stator field as are moved out of operative relation with the driving sections without generation of inducted current in the nondriving section.

Squirrel cage conductor bars 35 extend axially from a first end ring 36 at the outer end of rotor section 19 through the driving sections 19 and 20 near their periphery in the usual manner, and through the nondriving section 21 in a path rendered noninductive by placement remote from the periphery and close to the center, to a second end ring 37 situated beyond the rotor and fixed in relation thereto as by being mounted on the shaft, as indicated in Fig. 1. An intermediate short-circuiting conductor ring 38 divides the low and high resistance sections 19 and 20, determining the relative axial lengths of these sections by its spacing between the ends of that portion of the conductor bars 35 extending along near the periphery of the rotor. Thus, as shown in Fig. 1, the axial length of the low resistance section 19 is made substantially that of the stator, while the axial length of the high resistance section is about one-half that of the stator. The axial length of the high resistance driving stator 20 is determined by the distance between the intermediate ring 38 and the location where the conductors 35 change their course inwardly. In the present instance this makes the axial length of the high resistance section 20 about half that of the stator.

In order to keep the sections 19 and 20 close together and to keep low the resistance of the intermediate ring 38, the latter is made thin but deep radially. The end ring 36 and intermediate ring 38 with the slightly thickened portion of the conductor bars 35 between them, thus form a conventional squirrel cage winding of relatively low resistance for the rotor section 19.

The nondriving, noninductive, field shunting section 21 is of an axial length substantially equal to that of the stator. While it may be maintained substantially nonproductive of torque by having the conductor bars pass back through the driving section near its axis, as shown in my copending application Ser. No. 769,018, here in the present invention, as shown in Figs. 1 and 3, the conductor bars 35 simply continue on through the nondriving section but remote from the periphery and close to the center where there is little space occupied by magnetic material, thus presenting a poor path for the stator flux and rendering the conductor substantially ineffective to produce torque. This structure solves the problem of being able to extend the high resistance circuit directly on through the single continuous stack of laminations forming the three-section rotor while maintaining the field shunting section substantially nonproductive of torque.

To allow ample cross-sectional area for passage of the stator flux through the rotor laminations where the conductors 35 extend inwardly therethrough and to avoid undue radial length in the punchings in these laminations, the conductors 35 are offset in two stages in zig-zag path from the periphery to near the center of the rotor. This is accomplished by having the punchings in these laminations arranged as indicated in Figs. 4 through 7, which figures show fragmentary views of sections on lines 4—4, 5—5, 6—6, and 7—7 of Fig. 3, respectively.

It is preferable to insure concentration of a major portion of the resistance of the circuit of rotor section 20 beyond the rotor, and to this end that portion of the circuit conductors 35 extending from where the conductors leave the rotor to where they connect with the end ring 37 is rendered of higher resistance in any known or other suitable manner to provide a lumped resistance outside the rotor, as by having them formed of the same material as the rest of the conductors but somewhat thinner and looped as shown, to add extra length, or made of a material of higher resistivity.

Ducts 39 for coolant fluid such as air, are provided in the rotor by suitably aligned punchings as shown in Figs. 4 through 7, forming a circular array of cooling ducts extending longitudinally through the rotor between the periphery and the path of the high resistance circuit where it passes through the nondriving rotor section. This affords means for passing a cooling medium through the nondriving rotor section 21 between the periphery and the conductors therethrough, and out over the greater heat producing, lumped resistance portion of the conductors near the end ring 37. It is to be noted here that the slots or punchings for the air ducts may vary in shape and arrangement so long as they form a continuous duct through the stack of laminations and at the same time leave sufficient radial distance between them to carry the required flux, as indicated by the dotted lines and arrows in Figs. 4 to 7, inclusive.

To prevent any possible shunting of current through the rotor laminations between the conductors of the high resistance winding, those portions passing through the nondriving section 21 may be insulated as indicated at 40 in Fig. 3. For the sake of clearness a showing of such insulation has been omitted from Fig. 1 because of the small scale of that figure.

Fan blades, one of which is shown at 41 (Fig. 1), induce the flow of a coolant, in the present instance air, entering via an opening 42 in the motor frame and passing through the ducts 39 over the conductor loops near the end ring 37 and out through an opening 43 in the end bell 12. Thus the major portion of heat given off from the high resistance circuit where it passes through the rotor 21 near center, is absorbed by the coolant passing through the ducts between such source of heat and the main body of the rotor 21. A shield element 44 in the form of a circular partition or diaphragm fixed to the motor frame and extending into sliding engagement with a closure ring 45 carried at the free end of the nondriving rotor section 21, shields the stator winding and rotor from the heat producing, lumped resistance portion of the conductors near the end ring 37.

A cylindrical partition member 46 (Fig. 1), carried by the rotor and extending longitudinally therefrom into sliding engagement with a circular end partition member 47 forms with the shield element 44 an annular closed chamber 48 for the stator. A separate cooling system is provided for the chamber 48 in the form of centrifugal fan blades such as 49 (Fig. 1), carried by the rotating cylindrical partition member 46, and cooperating with an inwardly extending deflecting flange 50, to force the flow of a suitable gaseous coolant such as air or an inert gas, radially outwardly at the left hand end of the motor (Fig. 1), then longitudinally to the right through the inner wall space 51 and back via vent ducts 52 in the stator laminations to the base of the fan blades 49. Heat transferred from the circulating coolant to the outer wall of the frame 11 and fins 17 is then dissipated by radiation and convection.

In operation, at start, with the stator 22 over only the nondriving, noninductive rotor section 21, the latter provides a magnetic body of low reluctance acting as a shunting element for the stator field to maintain a high counter electromotive force in the stator winding and avoid undue current drain on the line. To start rotation of the rotor at low speed, the reversible control motor 33 is operated to move the stator from right to left (Fig. 1), gradually bringing the stator over the high resistance rotor section 20 to give the motor high starting torque with high slip and low current drain from the line. Then further operation of the control motor 33 to move the stator on over the low resistance section 19, further reduces the effective resistance of the combined driving rotor sections 19 and 20 gradually bringing the motor to a characteristic giving low slip and substantially constant speed with load changes.

To reduce speed or bring the motor to a stop, the control motor 33 is reversed; moving the stator back toward the nondriving, rotor section until the desired reduction if speed is obtained, or all the way to the nondriving section of stoppage is desired. Intermediate positions of the stator will give intermediate speeds which may be maintained for a considerable time without undue heating, due to the effective cooling system for dissipating heat generated in the windings, particularly the high resistance winding.

Although the present cooling system is adequate to prevent overheating due to frequent starting and stopping, and moderately sustained periods of low speed operation, as in the operation of cranes or hoists, the motor structure here disclosed readily lends itself to super cooling from an outside source, as by the use of cooling air supplied through the inlet opening 42 and cooling air blown over the fins 17 along the outside of the motor.

While one specific embodiment of the invention has been herein shown and described for the sake of disclosure, it is to be understood that the invention is not limited to such specific embodiment but contemplates all such modifications and variants thereof as fall fairly within the scope of the appended claims.

What is claimed is:

1. In a squirrel cage induction motor having a low resistance rotor section, a high resistance rotor section and a nondriving, noninductive, field shunting rotor section carried on a common motor shaft, and spaced axially thereon with the high resistance section intermediate the other rotor sections, a common field element for the rotor sections movably mounted to be brought successively into surrounding relation with said rotor sections, a low resistance squirrel cage circuit for the low resistance section, a high resistance squirrel cage circuit for the high resistance section, an end ring mounted about the shaft spaced axially from the outer end of the nondriving section, said high resistance circuit extending longitudinally through the nondriving section along a path remote from the periphery and close to the axis of the rotor to connection with the said spaced end ring, whereby the high resistance circuit may pass through the nondriving section without producing substantial torque in the nondriving section.

2. A motor as claimed in claim 1 in which the field shunting rotor section is provided with air ducts passing longitudinally therethrough and spaced therein radially from the axis between the radial spacing of said high resistance circuit through the nondriving, field shunting section and the periphery, whereby a large portion of the heat generated in the latter circuit may be absorbed before reaching the periphery by cooling air directed through the duct.

3. In a squirrel cage induction motor, a casing for the motor, a stator, a squirrel cage rotor having a low resistance driving section, a high resistance driving section and a non-driving, noninductive, field shunting section of low reluctance magnetic material, means to effect relative axial movement between the stator and the rotor to bring the stator successively into operative relation with different rotor sections, an end ring for the high resistance section situated outside the nondriving section, a low resistance circuit for the low resistance section, and a high resistance circuit for the high resistance section passing through the nondriving section via an inwardly offset passage in the nondriving section remote from the periphery and near the center and continuing into connection with said ring through substantially lumped resistance in the form of an extension outside the nondriving section having a major portion of the resistance of the circuit, said rotor having open ducts passing therethrough in circular array between the periphery and the said offset passage for directing a flow of coolant through the nondriving section between the periphery and the high resistance circuit and out over said circuit extension of lumped resistance and means shielding the stator from heat produced in the said lumped resistance, said shielding means consisting of a diaphragm fixed to the motor casing and extending into sliding engagement with a closure ring carried at the free end of the nondriving rotor element.

4. In a squirrel cage induction motor, a stator for supplying a rotating field, a motor drive shaft, a rotor element fixed to the shaft having a low resistance driving section, a high resistance driving section, and a nondriving, noninductive, field shunting section all formed in a single continuous stack of laminations of low reluctance magnetic material, said rotor element being of greater axial length than said stator, means for effecting relative axial movement between said stator and rotor to bring the stator successively into operative relation with different sections of the rotor, a low resistance squirrel cage circuit for the low resistance section, a high resistance squirrel cage circuit for the high resistance section, and an end ring for the high resistance circuit mounted about the shaft and spaced axially from the end of the nondrive section, said high resistance circuit extending through the nondriving section to its end ring via a path relatively remote from the periphery and relatively close to the center, whereby passage of the circuit through the nondrive section is ineffective to render the latter inductive.

5. In a squirrel cage induction motor, a stator for supplying a rotating field, a motor drive shaft, a rotor element fixed to the shaft having a low resistance driving section, a high resistance driving section, and a nondriving, noninductive, field shunting section all formed in a single continuous stack of laminations of low reluctance magnetic material, said rotor element being of greater axial length than said stator, means for effecting relative axial movement between said stator and rotor to bring the stator successively into operative relation with different sections of the rotor, a low resistance squirrel cage circuit for the low resistance section, a high resistance squirrel cage circuit for the high resistance section, an end ring for the high resistance circuit mounted about the shaft and spaced axially from the end of the nondrive section, said high resistance circuit extending through the nondriving section to its end ring via a path relatively remote from the periphery and relatively close to the center, whereby passage of the circuit through the nondrive section is ineffective to render the latter inductive, said rotor element having air ducts passing therethrough in circular array between the center and the circuits in the high and low resistance sections, and between the periphery and the high resistance circuit in the nondriving section.

6. A squirrel cage induction motor comprising a rotor having a low resistance driving section, a high resistance driving section and a nondriving section longitudinally spaced end to end and formed of a single stack of laminations of magnetic material, a stator element with means for effecting relative axial movement between the stator element and the rotor for selectively bringing the stator element into surrounding relation with said sections, a relatively low resistance squirrel cage circuit for the low resistance driving section, passing through channels formed by suitable punched openings in its constituent laminations near the periphery, a relatively high resistance squirrel cage circuit for the high resistance driving section extending through both said high resistance section and said nondriving section through suitable channels formed by punched openings in their constituent laminations and offset from near the periphery of the high resistance driving section to near the center of the nondriving section to pass out of the rotor through the nondriving section without rendering the latter inductive or substantially productive of torque, said high resistance circuit and its channels being offset in at least two steps, whereby none of the laminations need have punched openings of a radial length as great as the radial offset of the circuit.

7. In a variable speed squirrel cage induction motor having a low resistance rotor section, a high resistance rotor section and a nondriving, noninductive, field shunting rotor section, a common stator element shiftable successively into surrounding relation with the rotor sections, a low resistance squirrel cage circuit for the low resistance section, a high resistance squirrel cage for the high resistance section, an end ring for the high resistance circuit spaced away from the nondriving rotor section, said high resistance circuit extending through the nondriving section to said end ring close to the axis and remote from the periphery where it passes through the nondriving section and having a large portion of its resistance lumped outside the nondriving section between the nondriving section and the end ring, and means insulating said high resistance circuit from said nondriving section where it passes therethrough, whereby the reduction in distance between diametrically opposite circuit conductors due to their closeness to the axis will not operate to shunt out said lumped resistance.

8. A squirrel cage induction motor comprising a rotor having a low resistance driving section, a high resistance driving section, and a nondriving, noninductive, field shunting section, a stator surrounding the rotor and of an axial length substantially equal to that of the low resistance driving section, means for effecting relative axial movement between the stator and rotor to bring the stator into covering relation with the different rotor sections successively, a set of squirrel cage conductors for the low resistance driving section, a set of squirrel cage conductors for the high resistance driving section extending longitudinally from the high resistance section through the nondriving section in a circular array removed from the periphery and near the center of the nondriving section to a point outside the rotor beyond the end of the nondriving section, whereby extension of the conductors through the nondriving section is substantially ineffective to render the nondriving section inductive and thus produces substantially no torque therein.

9. An induction motor comprising a stator, a rotor, and a plurality of conductors having an outer portion extending longitudinally through one part of the rotor near its cylindrical surface and an inner portion extending longitudinally through another part of said rotor near its axis where there is little space occupied by magnetic material, said inner and outer conductor portions being connected by an intermediate conductor portion which follows a zig-zag path through the rotor composed of alternate radial and longitudinal sections, thus leaving an ample flux path for the stator flux between even said radial portions, to maintain an adequate flux path through the rotor from one pole piece of the stator to the other.

References Cited in the file of this patent

UNITED STATES PATENTS

| | | |
|---|---|---|
| 1,003,839 | Wiard | Sept. 19, 1911 |
| 2,748,334 | Miller | May 29, 1956 |

FOREIGN PATENTS

| | | |
|---|---|---|
| 250,743 | Great Britain | Apr. 22, 1926 |
| 528,832 | Germany | July 4, 1931 |
| 698,226 | France | Nov. 17, 1930 |